(12) United States Patent
Page, Jr. et al.

(10) Patent No.: US 6,595,828 B2
(45) Date of Patent: Jul. 22, 2003

(54) SYNTHETIC BEE POLLEN FORAGING PHEROMONE AND USES THEREOF

(75) Inventors: Robert E. Page, Jr., Davis, CA (US); Tanya Pankiw, College Station, TX (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/067,642

(22) Filed: Feb. 4, 2002

(65) Prior Publication Data

US 2002/0182977 A1 Dec. 5, 2002

Related U.S. Application Data

(60) Provisional application No. 60/266,018, filed on Feb. 2, 2001.

(51) Int. Cl.[7] .............................................. A01K 47/06
(52) U.S. Cl. ......................................................... 449/2
(58) Field of Search ..................................... 449/1, 2, 3

(56) References Cited

U.S. PATENT DOCUMENTS

| | | | |
|---|---|---|---|
| 5,135,758 A | | 8/1992 | Arnold et al. ............... 424/539 |
| 5,695,383 A | * | 12/1997 | Le Conte et al. ................ 449/2 |
| 5,750,129 A | | 5/1998 | Wakarchuk .................. 424/408 |
| 6,132,749 A | | 10/2000 | Saguchi et al. .............. 424/409 |

FOREIGN PATENT DOCUMENTS

| | | | |
|---|---|---|---|
| FR | 2593023 A1 | * 7/1987 | ..................... 449/2 |
| GB | 2095998 A | * 10/1982 | |

OTHER PUBLICATIONS

Allen, M.D. and Jeffree, E.P. "The influence of stored pollen and of colony size on the brood rearing of honey bees," *Ann. Appl. Biol.* 1956, pp. 649–656, vol. 44.

Al–Tikrity, W.S. et al. "The relationship between the amount of unsealed brood in honey bee colonies and their pollen collection," *J. Apic. Res.* 1972, pp. 9–12, vol. 11.

Arnold, G. et al. "Inhibition of worker honeybee ovaries development by a mixture of fatty acid esters from larvae," *C.R. Acad. Sci. Paris, Sciences de la vie/Life sciences* 1994, pp. 511–515, vol. 317.

Barker, R.J. "The influence of food inside the hive on pollen collection," *J. Apic. Res.* 1971, pp. 23–26, vol. 10.

Bitterman, M.E. et al. "Classical conditioning of proboscis extension in honey bees," *J. Comp. Psychol.* 1983, pp. 107–119, vol. 97.

Camazine, S. "The regulation of pollen foraging by honey bees: how foragers assess the colony's need for pollen," *Behav. Ecol. Sociobiol.* 1993, pp. 265–272, vol. 32.

Dreller, C. et al. "Regulation of pollen foraging in honey bee colonies: effects of young brood, stored pollen, and empty space," *Behav. Ecol. Sociobiol.* 1999, pp. 227–233, vol. 45.

Eckert, C.D. et al. "The relationship between population size, amount of brood, and individual foraging behavior in the honey bee," *Apis mellifera* L., *Oecologia* 1994, pp. 248–255.

Fewell, J.H. and Page, R.E., Jr. "Genotypic variation in foraging responses to environmental stimuli by honey bees, *Apis mellifera*," *Experientia* 1993, pp. 1106–1112, vol. 49.

Fewell, J.H. and Winston, M.L. "Colony state and regulation of pollen foraging in the honey bee, *Apis mellifera* L.," *Behav. Ecol. Sociobiol.* 1992, pp. 387–393, vol. 30.

Free, J.B. "Factors determining the collection of pollen by honey bee foragers," *Anim. Behav.* 1967, pp. 134–144, vol. 15.

Free, J.B. "Managing honey bee colonies to enhance the pollen–gathering stimulus from brood pheromones," *App. Anim. Ethol.* 1979, pp. 173–178, vol. 5.

Hölldobler, B. and Wilson, E.O. *The ants.* Harvard University Press, Cambridge, MA., pp. vi–xii (Table of Contets Only).

Jaycox, E.R. "Honey bee queen pheromones and working foraging behavior," *Annals. Ent. Soc. Am.* 1970, pp. 222–228, vol. 63.

Le Conte, Y. et al. "Brood pheromone can modulate the feeding behavior of *Apis mellifera* workers (Hymenoptera: Apidae)," *Apiculture and Social Insects* Aug. 1995, pp. 798–804, vol. 88, No. 4.

Le Conte, Y. et al."Chemical recognition of queen cells by honey bee workers *Apis mellifera* (Hymenoptera: Apidae)," *Chemoecology* 1994/1995, pp. 6–12, vol. 5/6.

Le Conte, Y. et al. "Attraction of the parasite mite *Varrao* to the drone larvae of honey bees by simple aliphatic esters," *Science* 1989, pp. 638–639, vol. 245.

Le Conte, Y. et al. "Identification of a brood pheromone in honey bees," *Naturwissenschaften* 1994, pp. 334–336, vol. 77.

(List continued on next page.)

*Primary Examiner*—Robert P. Swiatek
(74) *Attorney, Agent, or Firm*—Townsend & Townsend & Crew, LLP

(57) ABSTRACT

A method for increasing pollen foraging activity in colonies of bees by application of a synthetic brood pheromone to the colony. The synthetic brood pheromone may comprise methyl palmitate, ethyl palmitate, methyl stearate, ethyl stearate, methyl oleate, ethyl oleate, methyl linoleate, ethyl linoleate, methyl linolenate and ethyl linolenate; or an active mixture comprising one or more of the enumerated esters. Exposure of bees to the synthetic brood pheromone increases the proportion of pollen foragers in the colony. The invention also provides a pollination unit comprising a collection of bees and the synthetic brood pheromone, and a device capable of releasing the brood pheromone in a controlled fashion within the colony.

40 Claims, 6 Drawing Sheets

OTHER PUBLICATIONS

Le Conte, Y. et al. "The recognition of larvae by worker honey bees," *Naturwissenschaften* 1994, pp. 462–465, vol. 81.

Mohammedi, A. et al. "Effect of a brook pheromone on honeybee hypopharyngeal glands," *C.R. Acad. Sci. Paris, Sciences de la vie/Life sciences* 1996, pp. 769–772, vol. 319.

Mohammedi, A. et al. "Effect of aliphatic esters on ovary development of queenless bees (*Apis mellifera* L.)," *Naturwissenschaften* 1998, pp. 455–458, vol. 85.

Morse, R.A. and Calderone, N.W. "The value of honey bees as pollinators of U.S. crops in 2000," *Pollination* Mar. 2000, Cornell University, New York, NY, pp. 1–14.

Page, R.E. et al. "Genetic determinants of honey bee foraging behavior," *Anim. Behav.* 1995, pp. 1617–1625, vol. 50.

Page, R.E. et al. "The effect of genotype on response thresholds to sucrose and foraging behavior of honey bees (*Apis mellifera* L.)," *J. Comp. Physiol.* 1998, pp. 489–500, vol. A182.

Page, R.E. Jr. and Mitchell, S.D. "Self–organization and adaptation in insect societies," *PSA* 1990, pp. 28–298, vol. 2.

Pankiw, T. and Page, R.E. Jr. "Brood pheromone modulates honey bee *Apis mellifera* L. sucrose response thresholds," *Behav. Ecol. Sociobiol.* 2001, pp. 206–213, vol. 49.

Pankiw, T. and Page, R.E. Jr. "Brood pheromones stimulates pollen foraging in honey bees, *Apis mellifera* L.," *Behav. Ecol. Sociobiol.* 1998, pp. 193–198, vol. 44.

Pankiw, T. and Page, R.E. Jr. "Response thresholds to sucrose predict foraging division of labor in honeybees," *Behav. Ecol. Sociobiol.* 2000, pp. 265–267, vol. 47.

Pankiw, T. and Page, R.E. Jr. "The effect of genotype, age, sex, and caste on response thresholds to sucrose and foraging behavior of honey bees (*Apis mellifera* L.)," *J. Comp. Physiol.* 1999, pp. 207–213, vol. A185.

Pettis, J. et al. "Bees," Chapter 17 *In Pheromones of non–lepidopteran insects*. J. Hardie and A.K. Minks, eds., CAB International, 1999, pp. 429–450.

Seeley, T.D. *The wisdom of the hive. The social physiology of honey bee colonies.* 1995, Harvard University Press, Cambridge, MA., 6 pages total (Table of Contents Only).

Sokal, R.R. and Rohlf, F.J. *Biometry. The principles and practice of statistics in biological research.* 3rd Edition 1995, W.H. Freemand & Co., New York, NY., pp. vii–xi (Table of Contents Only).

Todd, F.E. and Reed, C.B. "Brood measurement as a valid index to the value of honey bees as pollinators," *J. Econ. Ent.* 1970, pp. 148–149, vol. 63.

Trouiller, J. et al. "Semiochemical basis of infestation of honey bee brood by *Varroa jacobsoni*," *J. of Chem. Ecol.* 1992, pp. 2041–2053, vol. 18, No. 11.

Trouiller, J. et al. "Temporal pheromonal and kairomonal secretion in the brood of honeybees," *Naturwissenschaften* 1991, pp. 368–370, vol. 78.

Trouiller, J. et al. "The kairomonal esters attractive to the *Varroa jacobsoni* mite in the queen brood," *Apidologie* 1994, pp. 314–321, vol. 25.

\* cited by examiner

SYNTHETIC BEE POLLEN FORAGING PHEROMONE AND USES THEREOF

CROSS-REFERENCES TO RELATED APPLICATIONS

This application claims the benefit of provisional application U.S. Ser. No. 60/266,018, filed Feb. 2, 2001, which is incorporated herein by reference.

BACKGROUND OF THE INVENTION

Technical Field

The invention relates to a synthetic pheromone composition relating to the foraging behavior of bees, to its composition and to its uses.

Introduction

Social insects perform all the tasks of colony growth and maintenance concurrently by division of labor. One view is that division of labor is an emergent property that is self-organized through the interactions of individual workers with stimuli in their environment (Page R. E., Jr. et al. *PSA* 2:28–298 (1990)). A division of labor emerges when individuals have different response thresholds for stimuli that release behavioral responses. The evolution of specific patterns of organization results as a consequence of selection acting on genetic variability affecting response threshold distributions of colonies.

Bees are insects of the order Hymenoptera, which feed on pollen and nectar. They constitute a group of about 20 000 species throughout the world, known taxonomically as the Superfamily Apoidea. Honey bees of the genus Apis belong to the family Apidae, a sub-group of this superfamily. Although the question of how many honey bee species exist is still debated among taxonomists, at least four species are commonly recognized: the dwarf, or midget, bee *Apis florea*, the giant, or rock, bee *Apis dorsata*, the oriental (Indian, Chinese, Japanese, etc.) bee *Apis cerana*, and the common (European, African, etc.) honey bee *Apis mellifera*. The existence of another giant bee, *Apis laboriosa*, has recently been confirmed.

Bees of the family Apoidea are eusocial insects, that is to say that they engage in favorable social activity. Depending on the species, a colony of bees consists of a queen, dozens to thousands of workers, and at certain seasons of the year anywhere from a few to a few-hundred drones. Among the members of the colony there is division of labor and specialization in the performance of biological functions.

Bees construct variously shaped cells to rear their brood and to store their food. In the genus Apis, general utilization of comb space is similar among the species, with honey stored in the upper part of the comb, with, beneath it, rows of pollen-storage cells, worker-brood cells, and drone-brood cells, in that order. The groundnut-shaped queen cells are normally built at the lower edge of the comb.

As an inherited behavior characteristic, all bee colonies tend to store a certain amount of honey and pollen as their food reserve. The quantity of food stored depends upon several factors, including the seasonal availability of forage, the worker population of the colony and its rate of reproduction, the capacity of the nest, etc. Another important inherited behavior characteristic lies in the colony's natural site of comb construction. For instance, some Apis species build single comb nests in the open, while others build multiple-comb nests in dark cavities.

In honey bees, studies suggest that colony environment modulates foraging behavior. The amount of pollen stored in the comb affects the proportion of pollen foragers. More stored pollen results in less pollen foraging (Allen M. D. et al., *Ann Applied Biol* 44:649–656 (1956); Fewell, J. H. et al., *Behav Ecol Sociobiol* 30:387–393 (1992); Fewell, J. H. et al., *Experientia* 49:1106–1112 (1993)). The amount of young larvae also affects the proportion of foragers collecting pollen: more larvae and empty space result in more pollen foraging (Al-Tikrity W. S. et al., J Apic Res 11:9–12 (1972); Barker, R. J., *J Apic Res* 10:23–26 (1971); Dreller C. et al., *Behav. Ecol. Sociobiol.* 45:227–233 (1999); Eckert C. D. et al., *Oecologia* 97:248–255 (1994); Fewell, J. H. et al., *Behav Ecol Sociobiol* 30:387–393 (1992); Free, J. B. *Anim Behav* 15:134–144 (1967); Free, J. B. *App Anim Ethol* 5:173–178 (1979); Jaycox 1970; Todd F. E. et al., *J Econ Ent* 63:148–149 (1970)). Larval substances soluble in hexane releases pollen foraging (Pankiw T. et al., *Behav Ecol Sociobiol* 44:193–198 (1998)).

Foraging behavior and the mechanisms that regulate foraging activity are important components of social organization. Recently the honey bee proboscis extension response to sucrose has been identified as a "window" into a bee's perception of sugar (Page R. E., Jr. et al. *PSA* 2:28–298 (1990)). The sucrose response threshold measured in the first week of adult life, prior to foraging age, predicts forage choice (Pankiw T. et al., *Behav Ecol Sociobiol* 47:265–267 (2000)). Bees with low response thresholds are more likely to be pollen foragers and bees with high response thresholds are more likely to forage for nectar. There is an associated genetic component to sucrose response thresholds and forage choice, such that bees selected to hoard high quantities of pollen have low response thresholds and bees selected to hoard low quantities of pollen have higher response thresholds.

The number of larvae in colonies also affects the number of bees foraging for pollen. Hexane extractable compounds from the surface of larvae (brood pheromone) significantly increase the number of pollen foragers (Pankiw T. et al., *Behav Ecol Sociobiol* 44:193–198 (1998); Pankiw T. et al., *J Comp Physiol A* 185:207–213 (1999); Pankiw T. et al., *Behav Ecol Sociobiol.* 49:206–213 (2001)). Brood pheromone decreases the sucrose response threshold of bees suggesting a pheromone-modulated sensory-physiological mechanism for regulating foraging division of labor. Honey bees respond reflexively to sucrose by extending the proboscis when a sufficiently concentrated solution touches the antennae (Bitterman, M. E. et al., *J Comp Psychol* 97:107–119 (1983)). Brood pheromone significantly decreased response thresholds as measured in the proboscis extension response assay (PER-RT assay), a response associated with pollen foraging (Page R. E. et al., *Anim Behav* 50:1617–1625 (1995)). Pollen foragers have lower sucrose response thresholds than do nectar foragers (Page R. E. et al., *J Comp Physiol A* 182:489–500 (1998)). Water foragers have the lowest response thresholds to sucrose as pre-foragers, pollen foragers have the next lowest response thresholds, followed by nectar foragers, and foragers returning empty have the highest response thresholds (Pankiw T. et al., *Behav Ecol Sociobiol* 47:265–267 (2000)).

Response thresholds to sucrose are also plastic, modulated by nutritional status and previous foraging experience. Response thresholds are lower in bees fed lower quality sucrose solutions for 24 hours than bees fed high quality solutions. Previous foraging experience with low or high quality sucrose solutions modulates response thresholds in the same way. Genotype places a constraint on phenotypic response threshold plasticity such that strains of bees that were selected to hoard high or low quantities of pollen (Page R. E. et al., *Anim Behav* 50:1617–1625 (1995)), when fed high or low quality sucrose solutions have response thresholds that are proportionately modulated, however strain differences are maintained at all concentrations fed.

Reports have suggested that nectar foraging may be induced by nurse bees by the secretion of a substance inhibiting pollen foraging in workers. (Camazine, S. *Behav Ecol Sociobiol.* 32:265–272 (1993)). By this proposed mechanism, foraging behavior is controlled by the indirect effects of nurse bees producing a pollen-foraging inhibitor, with the amount of inhibitor available to feed to foragers depending on the amount of pollen stored and the number of larvae that must be fed. In a recent book on honey bee social organization, this explanation is supported as the way bees regulate pollen collection. (Seeley T. D. *The social physiology of honey bee colonies.*"Harvard University Press, Cambridge Mass." (1995)).

The direct value of honey bees as pollinators is valued at more that $14 billion annually in the United States. However, commercial honey bee populations are continually dwindling due to recently imported parasites and pathogens, and due to the invasion of the Africanized Honey Bee.

According to Morse et al., the value of the rental bee colony business alone in 1999 was close to $6 billion in the United States, with the leading crops utilizing such services comprising apple, melons, alfalfa seed, plum/prune, avocado, blueberry, cherry, vegetable seed, pear, cucumber, sunflower, cranberry and kiwi. This value does not include the value of spillover pollination, where the bees are released to pollinate a crop for free for the benefit to the beekeeper of collecting honey.

Parasitic mite and mite-related diseases have caused the death of most wild honey bees in the United States, on the order of 95 to 98 percent of the wild honey bee colonies, and left commercial colonies at risk. In particular, the Varroa mite represents a great threat to beekeeping, and beekeepers have only one registered chemical (Apistan) to control Varroa mites. In Europe, mites have already become resistant to that chemical.

The colonies kept by commercial beekeepers have also suffered serious losses. Research on the biology and control of bee foraging may make it possible for the industry to compensate with fewer colonies and still provide needed pollination of crops. Some 90 different crops-ranging from apples to zucchini and cantaloupes to cucumbers—depend on honey bee pollination. To some extent, other insects will pollinate specific crops. However, no insect is as widely effective as the honey bee, and with the disease losses among wild and hobbyist honey bees, the commercial honey bees are more important than ever.

For this reason, alternatives have been proposed. Bumble bees (Bombus) are increasingly used in greenhouse cultivation, where a honey bee hive would be too large, e.g., cabbage and carrot for seeds, kiwi fruits, strawberries, summer squash, eggplant and tomatoes for fruit. About a quarter of a million colonies of bumble bees are reared artificially every year, and they are used in over thirty different countries on over twenty-five crops. Hence, bumble bees are of great economic importance, and with the increase of glasshouse cultivation, and the spread of the mite, *Varroa jacobsoni,* causing a decline in honeybee populations, their importance can only increase. This is in spite of the fact that bumble bees do not produce harvestable quantities of honey, though they do store a small amount to sustain themselves for short periods.

The ability to manipulate the rates and timing of the bee foraging behaviors would be a great advantage to the beekeeper. With continuing pressures on honey bee populations, there is a need to be able to maximize the ability of existing colonies, or alternative species of the bee family, to ensure pollination of crops.

It is therefore an object of the present invention to provide methods and compositions which will aid in directing the foraging behavior of bees, and related methods for use in bee colony management.

BRIEF SUMMARY OF THE INVENTION

The present invention is directed to the identification of synthetic compositions and methods useful in directing foraging activity in bees. Accordingly, the present invention comprises a composition, synthetic brood pheromone, which will influence the behavior of foraging bees. The invention also provides a method for increasing pollen foraging activity in bees, by applying a synthetic brood pheromone comprising methyl palmitate, ethyl palmitate, methyl stearate, ethyl stearate, methyl oleate, ethyl oleate, methyl linoleate, ethyl linoleate, methyl linolenate and ethyl linolenate; or an active mixture comprising one or more of the enumerated esters, to a bee colony to increase the proportion of pollen foragers present in the colony.

A number of different approaches may be used to apply or affix the synthetic brood pheromone to the colony. It is necessary that the bees come into contact with the pheromone, and it is preferred that the pheromone has a reasonable period of time for release within and to the colony. Any such method can be used, so long as the application of the synthetic brood pheromone to the bees results in an increase in the proportion of pollen foragers within the colony.

In one preferred method for utilizing synthetic brood pheromone, colonies are supplied with synthetic brood pheromone, whereby the bees are directed to forage for pollen even when there is no brood in the colony.

In another preferred embodiment, synthetic brood pheromone is used as an aid in bee management, by directing colonies to accumulate extra pollen, which can benefit colonies, i.e., to increase overall nutrition of the colony or to prepare the colony with important pollen stores for overwintering.

Alternatively, the increase in forager activity may directly benefit the beekeeper or the farmer, by keeping bees in the field collecting pollen longer. This may be a benefit when extending pollination over a long flowering season, to re-initiate pollination for a new crop, or even to initiate pollen foraging activity in time for an early flowering crop. Finally, the beekeeper may benefit if collecting pollen for commercial purposes, by increasing the yield of pollen produced by a hive.

In some cases by extending the bees pollen foraging activity, synthetic brood pheromone will benefit the colony by helping to stabilize the colony, which could be important when establishing a new colony without brood, or to keep a colony together long enough to establish a new queen within the colony. The synthetic brood pheromone reduces the drift of bees away from an establishing or temporary colony. In many applications, such as where a new colony is being established with a new queen, there may be an advantage to additionally applying queen mandibular pheromone to the colony with the synthetic brood pheromone, as the queen mandibular pheromone will further aid in keeping the workers returning to the colony.

In a preferred embodiment, the synthetic brood pheromone is incorporated into a device for insertion into the bee colony.

In a further embodiment of the present invention synthetic brood pheromone is incorporated as part of a "pollination unit", which allows the rapid establishment of a quantity of bees in the field focused on pollination. The simplest version of such a pollination unit includes a collection of bees and a sufficient quantity of synthetic brood pheromone to create a temporarily stable population of bees. Such a unit preferably includes at least about 5,000 bees, and preferably in the range of about 10,000 to 15,000 or more when using honey bees (approximately 3 to 5 pounds of honey bees). In a more preferred embodiment, a quantity of synthetic queen mandibular pheromone is included with the pollination unit.

The pollination unit includes the synthetic brood pheromone, either affixed to the housing or provided in a separate form for application of the synthetic pheromone to the colony.

With such a unit, the responsibility of hive maintenance is dispensed with, and the entire unit may even be disposable, in the sense that the colony can be left in an orchard at the end of the pollination season.

The pollination unit may be supplied with a comb and a quantity of food, such as sugar, for the establishment of the unit. In a preferred embodiment the pollination unit will include a housing unit appropriate for the social activities of the colony of honey bees. For temporary disposable applications, the housing unit will be disposable itself, and preferably of biodegradable materials. In such a case, the manager of an orchard may treat the pollination unit as fully disposable unit, with no need to remove the bees or the housing from the orchard or field at the end of the season. This may be especially advantageous where numerous such units are to be applied to the field or orchard, and where subsequent seasonal activities, such as spraying, may be harmful to a traditional breeding colony. If the pollination unit is disposable, the bees will drift away or die over time, with no brood or queen to permanently link them to the housing unit.

Alternatively, the pollination unit may include a queen, for the establishment of a permanent, breeding colony.

DETAILED DESCRIPTION OF THE INVENTION

Figure 1:
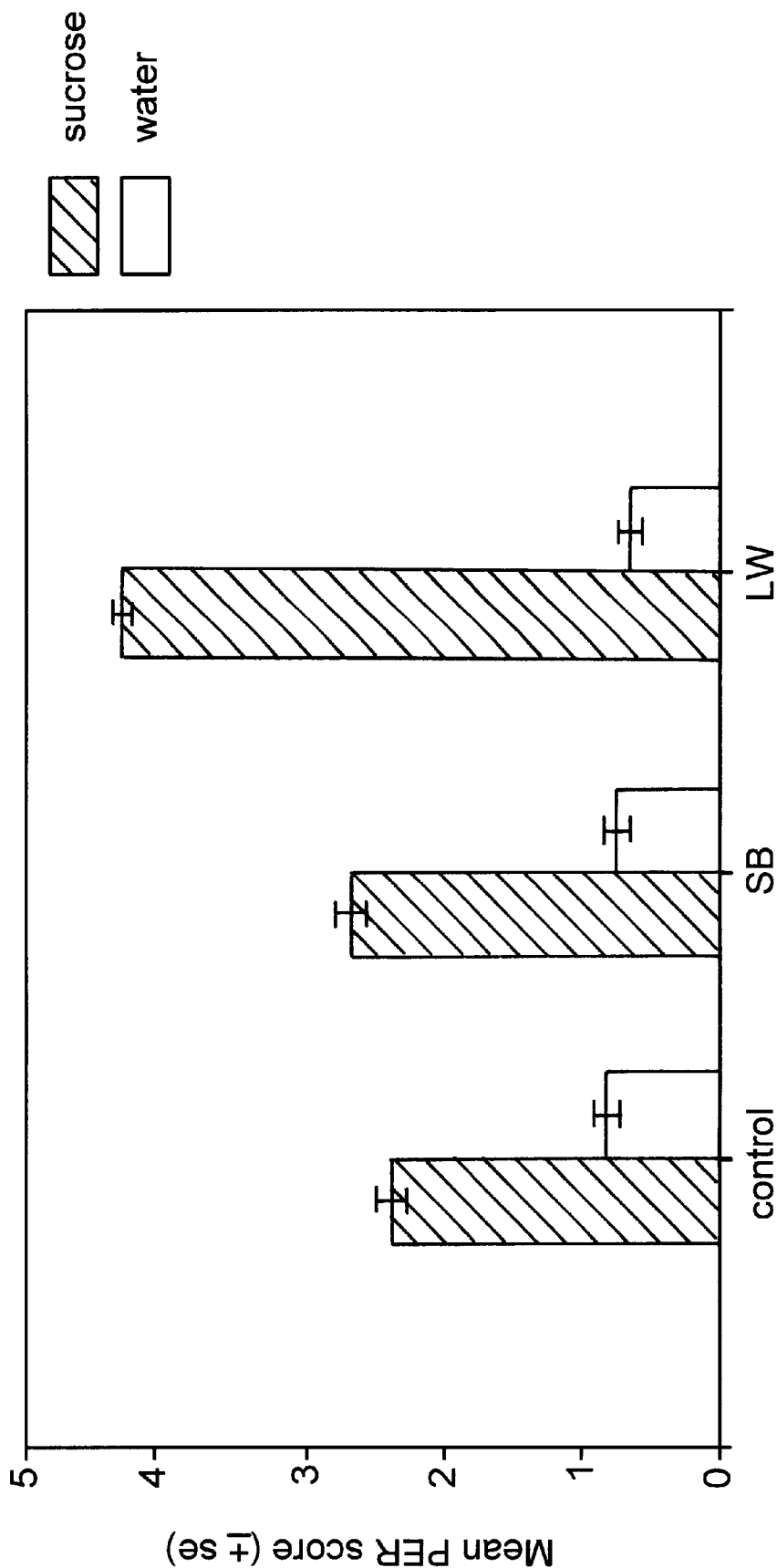
FIG. 1 provides the PER scores of bees in response to sucrose (gray bars) and water (open bars), from the experiments in Example 4.

By this invention synthetic brood pheromone compositions are disclosed, as well as the use of such pheromones in manipulating the pollen foraging behavior of bees.

In contrast to the teaching that nectar foraging is induced by nurse bees through the secretion of substances inhibiting pollen foraging in workers, methods are provided herein whereby synthetic brood pheromone provides a surprising, simple and direct phermone for directing pollen foraging behavior in a colony of bees.

The synthetic brood pheromone provides a strong stimulator for pollen foraging. When added to a colony, the number of pollen foragers (the pollinators) is greatly increased, making each colony a better pollinating unit.

The methods presented herein are preferably employed with bees of the family Apidae. The family Apidae is the most evolved family of the order Hymenoptera, the social and anthophilous insects. This family includes the subfamily Bombinae (including bumble bees and orchard bees) Meliponinae (stingless bees of the tropics) and Apinae, which includes the modem honey bees (genus Apis). Bees are responsible for pollinating plants that provide much of our food; in North America it is believed that 30% of food for human consumption originates from plants pollinated by bees.

Honey bees are generally thought of as the most common pollinator, and are the most widely studied, but bumble bees are the chief pollinators of red clover, alfalfa, and in some areas cotton, raspberries, apple and plum blossom. In regions where honey bee pollination is limited by low temperatures, bumble bees are frequently the chief pollinators. Bumble bees (Genus Bombus) are semi-social bees with similarities to the honey bee. Bumble bees have a queen that produces drones, workers and other queens. However, the colonies are annual, unlike the honey bee's year-round colonies.

Bumble bees are preferred pollinators of many crops for three reasons: 1) they can fly at much lower temperatures than honeybees, as low as 10° C. and sometimes even lower; 2) many species have longer tongues than honeybees, so they can pollinate flowers with long, narrow corollas; and 3) they are very hairy and their hairs are branched and so are perfect for picking up and transferring pollen.

Hence, in a preferred embodiment, synthetic brood pheromone is used to direct pollen foraging behavior of the bees of the genus Bombus, or bumble bees.

Another preferred method involves directing pollen foraging behavior of the honey bee, more particularly, honey bees of the species *Apis mellifera*, although the use of the synthetic brood pheromone to drive foraging activity will find use with the other species of Apis. *Apis mellifera* has been introduced throughout the world due to its great advantages for purposes of beekeeping as a commercial enterprise. In some parts of Asia where beekeeping with *A. mellifera* has become a great commercial activity, there are very few colonies of *Apis cerana* left, most being found with farmers in remote villages.

However, *Apis cerana* is resistant to common mites such as Varroa and Tropilaelaps, whereas *Apis mellifera* is highly susceptible to them and requires expensive chemicals to control them. For this reason A. cerana has been proposed as an important option in providing global pollinator biodiversity. Further, five sub-species of A. cerana are also know, namely, A. cerana cerana, A. cerana skorikovi, A. cerana abaensis, A. cerana hainanensis, and A. cerana indica. Among these, A. cerana cerana found in the high mountain areas of Nepal, India, and China is larger in size than other cerana species and some experts consider that it more closely matches Apis mellifera in behavior and honey production, thus representing some potential for improvement in this species for commercial use.

As used herein, synthetic brood pheromone means a component or combination of components present in the hexane wash of larvae, and which is active in directing the foraging behavior of worker honey bees exposed to the component(s). In one embodiment, the synthetic brood pheromone comprises a mixture of methyl palmitate, ethyl palmitate, methyl stearate, ethyl stearate, methyl oleate, ethyl oleate, methyl linoleate, ethyl linoleate, methyl linolenate and ethyl linolenate. However, any component or combination active in increasing pollen foraging activity of the worker is also contemplated by this definition. For example, in some embodiments, the synthetic brood pheromone of the invention consists essentially of a single component listed above. In some embodiments the single component is methyl oleate.

The "old" larvae extract is summarized in Table 1. However, the components or combination of components necessary to drive forager activity have not been elucidated, and any combination of the components of synthetic brood pheromone provided by the table which are effective, are encompassed by this invention.

In one preferred embodiment, the components are mixed in the ratio of the 10 predominant esters found in the hexane wash of older larvae. This composition comprises, by weight, about 1% ethyl linoleate, about 13% ethyl linolenate, about 8% ethyl oleate, about 3% ethyl palmitate, about 7% ethyl stearate, about 6% ethyl linoleate, about 21% methyl linolenate, about 25% methyl oleate, about 3% methyl palmitate, and about 17% methyl stearate.

The synthetic brood pheromone functions in the colony as a "brood surrogate", by mimicking the signals of a breeding colony and imparting the perception to the honey bee workers of a brood and all of the responsibilities that attend to it. Regarding foraging behavior, the addition of synthetic brood pheromone to the colony gives the workers a new control set-point, with added perceived brood pheromone providing a positive stimulus to pollen foraging. Pollen foraging will continue until the accumulated pollen stores can countervail the extra brood pheromone stimulus. Thus, for any set of colony conditions the synthetic brood pheromone will result in an increase in pollen foraging activity within the colony, for a given set of conditions.

The manner in which the foraging activity is increased is not important to the invention. This may be accomplished by increasing the proportion of pollen foragers in the colony, or it may be accomplished by shifting the percentage of foraging behavior of individual bees toward pollen foraging.

The use of synthetic brood pheromone of this invention allows a very cost-effective method to accomplish the goals of stabilization and behavior management of bee colonies. The cost of the esters used to produce the synthetic brood pheromone is very small, and processes for combining the compounds is simple, and well known to the art. The synthetic brood pheromone is easily oxidizable, and must be stored in low-oxygen conditions, preferably at −20° C., and most preferably at −70° C. if it will be stored for any long period of time. Alternatively, the synthetic brood pheromone may be solubilized, encapsulated or otherwise trapped within a substrate.

Any of numerous other methods known to the art for release of the synthetic brood pheromone to the colony may be utilized. For instance, the synthetic brood pheromone may be solubilized in an organic substance, such as paraffin, vegetable wax or beeswax. It may also be suspended in water, such as by suspending in a colloidal gel matrix.

Many mechanisms are available for the delivery of the synthetic brood pheromone to the colony. Various types of aerosol, vapor, liquid, solid or even powdered substrates will allow control of the placement and/or timing of release of the pheromone within the colony. U.S. Pat. No. 5,750,129, issued May 12, 1998 to Wakarchuk, discloses a device useful in the controlled release of pheromones and other semiochemicals. This patent describes various structures and devices, which have been employed in the controlled release of pheromones, and claims a permeable release rate controlling polymer membrane, preferably using matrix materials which are polyurethanes. By varying the semiochemical load, the cross-linking density of the matrix, the presence of various resin additives, and the type of permeable membrane, a variety of release characteristics are obtained.

Preferred are methods such as claimed in U.S. Pat. No. 5,750,129, which incorporate a pheromone in a solid substrate. Various substrates, both organic and inorganic are suitable for this purpose, including silica, alumina, cellulose, modified cellulose, dry vegetable matter, and synthetic polymers. Moldable synthetic polymers may be fashioned as devices to allow simple addition to or insertion into the colony.

U.S. Pat. No. 6,132,749, issued Oct. 17, 2000, to Saguchi, et al., discloses sustained release pheromone-containing preparation incorporating a pheromone into a powdered synthetic resin, which can then be sprayed by known methods providing constant release of the pheromone over a broad area of coverage for a long period of time.

U.S. Pat. No. 4,990,331, "Novel Pheromone Composition for Use in Controlling Honey bee Colonies", issued Feb. 5, 1991, to Slessor, et al., discloses methods for using queen-produced mandibular gland substances to control worker bee activity toward the establishment and stabilization of the colony. Phero Tech Inc. (7572 Progress Way, Delta, British Columbia, Canada), produces such products using the queen mandibular pheromone. One such product is called Bee Boost™, and is provided as a small plastic release device containing queen mandibular pheromone. Bee Boost is used to aid management of honey bee colonies as a "pseudoqueen", contributing to hive stability when shipping queenless packages of bees, and also improving queen rearing success when used in queen mating.

The Examples demonstrate the manner in which the foraging behavior of honey bees is directed using the synthetic brood pheromone. Synthetic brood pheromone stimulates and releases pollen foraging in foraging bioassays. Synthetic brood pheromone has dose-dependent effects on the modulation of sucrose response' thresholds, acting as a releaser of pollen foraging in older bees and a primer pheromone on the development of response thresholds.

With the methods provided herein, synthetic brood pheromone may be used to increase the number of pollen foragers of a honey bee colony. The pheromone acts to lower response thresholds to sucrose, the sensory-physiological correlate of pollen foraging behavior in honey bees.

The examples demonstrate that synthetic brood pheromone decreases honey bee sucrose response thresholds, and example of a pheromones modulating a sensory-physiological process, the PER response to sucrose. A shift in response thresholds acts on division of labor for foraging, resulting in a specific organizational pattern of behavior as a consequence of varied response thresholds in the colony, shifting a proportion of workers to a specific role, i.e., pollen foraging.

Water responses in this experiment were not modulated to the same degree as sucrose responses. Although responses to sucrose and water are not completely independent, they are different. In a previous study, water responses were not significantly different between high and low pollen hoarding strain pre-foragers and did not increase with age at the same rate as sucrose responses (Pankiw T. et al., J Comp Physiol A185:207–213 (1999)). However, just prior to foraging low strain bees became significantly more responsive to water than did high strain bees (Pankiw T. et al., J Comp Physiol A185:207–213 (1999)). It's not clear if other known foraging stimuli such as, empty comb space or, changes in adult demography modulate responsiveness to water.

Bees showed dose-dependent responses to brood pheromone in the PER-RT assay. The synthetic brood pheromone at a dose of 100:1 and larval washes at 1:1 were equally efficacious in decreasing sucrose response thresholds. While the responsibility of the esters in the larval washes for this behavior was not quantified, is possible that one or a combination of esters modulates response thresholds and the hexane washing technique extracts similar quantities to that of "old" SB at 100:1. Alternately, the synthetic blend may not contain a substance (or substances) that increases the efficacy of brood pheromone to modulate response thresholds. It is clear that increasing the amount of esters to 100:1 significantly decreased response thresholds.

A dose of synthetic brood pheromone at 1000:1 increased response thresholds above that of the control. This is interesting because colonies given additional larvae to stimulate pollen foraging also have bees with significantly younger foraging ages. Response thresholds change with age, decreasing with the onset of foraging (Pankiw T. et al., J Comp Physiol A185:207–213 (1999)). Brood pheromone may modulate behavioral development, with modulation dependent on the ratio of larvae to bees in the colony.

The high dose of 1000:1 of synthetic brood pheromone also resulted in high mortalities. This is most likely due to a combination of high dose and cage size. Such a high dose of pheromone in a small area would not be encountered in nature. Bees did not appear to be repelled by the 1000:1 dose of pheromone. Spiracles may have become blocked due to an excess amount of lipids on the surface, or other factors may have contributed to the cause of death. Most of the dead bees appeared on the bottoms of cages the day prior to the PER assay, explaining why sucrose and water consumptions were not significantly different, and indicating that these bees did not feed differently from the other treatments.

Synthetic brood pheromone acts as a releaser of pollen foraging as demonstrated in Experiment 7. Releaser effects comprise a response to a stimulus mediated by the nervous system (Hollbobler B. et al., Annals Ent Soc Am 63:222–228 (1990)). Pollen foraging was stimulated one hour after applying the pheromone and decreased to control levels one hour after treatment removal. Experiments 6 and 7 indicated that the releaser response is dose dependent, and that over time the pheromone is rendered ineffective or is removed. In a previous study larval washes singularly stimulated pollen foraging (Pankiw T. et al., Behav Ecol Sociobiol 44:193–198 (1998)).

EXAMPLES

For the purposes of statistical analyses and visual displays the results from PER-RT assays were transformed to sucrose and water response scores. The sucrose score is the total number of responses of the bee to antennal stimulation and is directly related to the response threshold of the individual because most bees continue to respond to all increasing concentrations of sucrose following their initial response. High scores indicate low response thresholds to sucrose, and low scores indicate high response thresholds to sucrose. Mann-Whitney U tests were used to analyze treatment effects in Example 3. Saturated categorical models were used to analyze sucrose and water scores in Examples 4 and 5 (CATMOD of SAS; (Stokes M. E. et al., Categorical Data Analysis Using the SAS System. SAS Institute Inc., Cary, N.C. (1997)). The volume of sucrose and water consumed by caged bees was normally distributed so ANOVA was used to determine consumption differences among treatments. Contingency table analyses were used to analyze the forager count data of Examples 6 and 7. Entrance count data were normally distributed permitting repeated-measures analysis to determine the effects of treatment and time after treatment on forager activity in Experiment 4 (Sokal R. R. et al., Biometry. The principles and practice of statistics in biological research., "3 edn. W. H. Freemand and Company, New York, N.Y." (1995)).

Example 1

Larval Washes (LW) and the Synthetic Blends (SB) of Brood Pheromone

Larval washes were prepared by soaking 200 2–4 day old larvae in 10 ml of HPLC grade n-hexane (Fisher Scientific) for 1 hour at 20° C. (after Le Conte, Y. et al., Science 245:638–639 (1989)). This is a preparation of 200 larval equivalents (Leq), called LW. The preparations were decanted into amber glass vials and stored in a −20° C. freezer prior to use. Trouiller J. "La communication chimique inter- et intraspccifique chez l'abeille. Ph. D. Thesis, University of Paris, France" (1993) characterized the chemical components soluble in hexane from larvae of various ages. "Young" and "old" larva blends of 200 Leq in 10 ml hexane were formulated, as "young" and "old" synthetic blends (SB), respectively (table 1; synthetic brood pheromone blends as a percent of total esters). After formulation, the synthetic blends were handled in the same way as the larval washes. All of the preparations were stored at −20° C. for no longer than 14 days prior to use.

TABLE 1

| Compound | "young" larva (11 ng/larva*) | "old" larva (560 ng/larva*) |
| --- | --- | --- |
| ethyl linoleate | 3 | 1 |
| ethyl linolenate | 7 | 13 |
| ethyl oleate | 33 | 8 |
| ethyl palmitate | 12 | 3 |
| ethyl stearate | 15 | 7 |
| methyl linoleate | 10 | 2 |
| methyl linolenate | 0 | 21 |
| methyl oleate | 11 | 25 |

TABLE 1-continued

| Compound | "young" larva (11 ng/larva*) | "old" larva (560 ng/larva*) |
|---|---|---|
| methyl palmitate | 9 | 3 |
| methyl stearate | 0 | 17 |

*total esters in 1 larval equivalent (Leq)

Example 2

The Proboscis Extension Response Assay (PER-RT Assay)

The proboscis extension response (PER) was used to determine a bee's responsiveness to increasing concentrations of sucrose (see Page R. E. et al., *J Comp Physiol A* 182:489–500 (1998)). Honey bees reflexively extend the proboscis in response to antenna] stimulation with a sufficiently concentrated sucrose solution (Bitterman, M. E. et al., *J Comp Psychol* 97:107–119 (1983)). The concentration at which an individual responds the sucrose response threshold (PER-RT). Bees were mounted in small brass tubes that restrained movement but allowed free movement of the antennae and mouthparts (Bitterman, M. E. et al., *J Comp Psychol* 97:107–119 (1983)). The bees were not immobilized by chilling prior to mounting in the brass holders. Bees were allowed to recover for approximately 30 minutes before testing. Bees were tested with an ascending concentration series of sucrose solutions alternated with water. That is, each antenna was touched once with the following solutions in this order: water, 0.1%, water, 0.3%, water, 1%, water, 3%, water, 10%, water, 30%. The proboscis extension responses of the bees were recorded. Mean PER scores indicate the mean sum of responses to sucrose or water. That is, a score of 6 indicates that an individual responded to all sucrose concentrations and thus has a low response threshold to sucrose. A score of 1 indicates an individual responded only to 30% sucrose and thus has a high response threshold to sucrose.

Example 3

Effect of Larval Washes on PER-RT

Two hundred newly emerged workers from 3 mixed "wild-type" sources were placed into plexi-glass and wire-mesh cages (14.6 cm×10 cm×7.7 cm). Two cages of bees were prepared and randomly chosen for one of two treatments: 1) 200 Leq of LW (n=83), and 2) 10 ml hexane control, (n=81). The treatments were applied to hexane rinsed glass plates (9.5 cm×5 cm) and suspended in the cages. The plates were approximately the same area that 200 larvae would occupy in wax combs. Ten milliliters of hexane or hexane washes of larvae were spread as evenly as possible over one side of each plate and the hexane was allowed to evaporate in a fume hood. Every twenty-four hours the previous day's plate was removed from the cage and replaced with a freshly treated plate. Bees were provided with 30% sucrose ad libitum. Solution consumption was measured daily to test for possible indirect effects of pheromone. The bees were reared in an incubator maintained at 32° C. for seven days. On the eighth day PER-RT was measured.

Bees exposed to LW for 7 days had significantly higher sucrose scores in the PER-RT assay than control bees ($X_{LW}$ 3.6±0.1 (standard error), $X_{control}$, =1.9±0.2; Mann-Whitney U=1,469.0, P<0.000 1). A higher sucrose score means a lower response threshold to sucrose.

There was no treatment effect on responses to water ($X_{LW}$=0.4+0.1, $X_{control}$=0.3±0.1; Mann-Whitney U 2,019.5, P>0.05). Amount of daily sucrose consumption was not significantly different between treatments ($X_{LW}$=2.3±0.3 ml; $X_{control}$=2.8±0.4 ml; ANOVA $F_{1,7}$=2.9, P>0.05). There were no significant differences in consumption between days (ANOVA $F_{1,7}$=3.5, P>0.05).

Example 4

Effect of Synthetic Blends and Larval Washes of Brood Pheromone on PER-RT

Cage preparation, sources and number of bees were the same as in Experiment 1. In this experiment there were three treatments: 1) 200 Leq of LW, 2) 200 Leq of "old" SB and, 3) hexane control. The treatments were applied daily for seven days on glass plates as described in Experiment 1. On the eighth day bees were tested for their responsiveness to sucrose and water in the PER assay. Sucrose consumption was measured every 48 hours. The experiment was replicated 3 times. True replication took place with different bees and cages for each replicate of the protocol. For the following treatments the number of bees tested for replicates 1 to 3, respectively, were: LW 100, 100, 100; SB 95, 86, 98; Control 98, 103, and 97.

FIG. 1 provides the PER scores of bees to the sucrose (gray bars) and water (open bars), from Example 4. Bees were exposed to brood pheromone preparations made from hexane washes of larvae (LW) a synthetic blend (SB), or no pheromone control for their first six days of adult life.

Larval washes of brood pheromone significantly lowered the sucrose response thresholds of adult bees. There was no effect of replicate on sucrose scores ($X^2$=3.1, 2 df, P>0.05). There was a significant treatment effect on proboscis responses to sucrose ($X^2$=324.6, 2 df, p<0.000 1; FIG. 1) justifying unplanned paired treatment comparisons. Paired comparisons showed bees exposed to brood pheromone for seven days had significantly lower sucrose response thresholds than control ($X^2$=237.0, 1 df, P<0.000 1) and synthetic blend treated bees ($X^2$=166.8, 1 df; P<0.000 1). There was no difference between control and synthetic blend treated bees for sucrose scores ($X^2$=3.5, 1 df, P>0.05).

There was no effect of replicate on water scores ($X^2$=3.2, 2 df, p>0.05). There was no significant effect of treatment on water scores ($X^2$=2. 1,2' df, p>0.05; FIG. 1). The average amount of sucrose consumed by the cages of bees was 10.7±0.5 ml per 36 hours. There were no significant effects of replicate (F=0.97, 1 df; p>0.05), date (F=0.62, 3 df, p>0.05), or treatment (F=1.20, 2 df, p>0.05) on the amount of sucrose consumed.

Example 5

Dose-Dependent Synthetic Brood Pheromone Modulation of PER-RT

The purpose of this experiment was to determine PER-RT dose responses. Two hundred newly emerged workers from mixed "wild-type" sources were placed into plexi-glass and wire-mesh cages (as above). Cages were provided with 20 ml of a 30% sucrose solution and 20 ml of water daily. Daily consumption of liquids was determined by measuring the amounts remaining in the vials. There were five treatments in this experiment: 1) LW at a dose of 1 Leq to 1 adult bee daily (dose of 1:1), 2) SB at a dose of 10:1, 3) SB at a dose of 100:1, 4) SB at a dose of 1000:1, and 5) control given a hexane rinsed glass plate daily. The SB used was the "old larva" blend (Table 1). Bees were measured for their PER-RT on day five. The number of dead bees on the bottom of the cages was counted to determine mortality. The experiment was replicated 3 times. True replication took place with different bees and cages for each replicate of the protocol. Sixty bees per replicate per treatment were tested for PER-RT.

Figure 2:
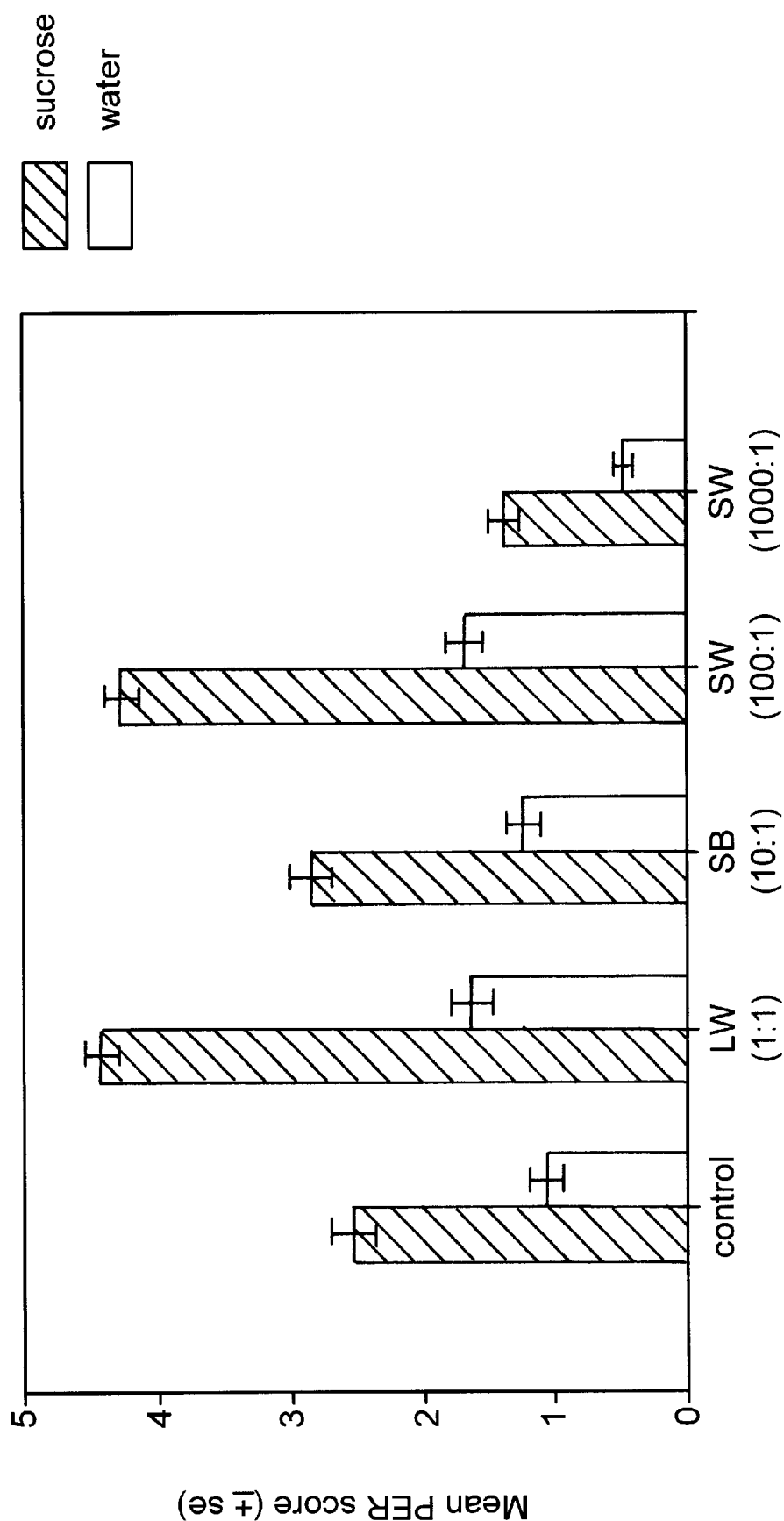
FIG. 2 shows the PER scores of bees to sucrose (gray bars) and water (open bars) from Example 5.

FIG. 2 shows the PER scores of bees to sucrose (gray bars) and water (open bars) when exposed to brood pheromone preparations made from hexane washes of larvae (LW) at a dose of 1:1 larval equivalents to bees, and doses of synthetic blend (SB) pheromone, as in Example 5.

There was no effect of replicate on sucrose scores ($X^2=0.7$, 2 df, $P>0.05$). There were significant effects of treatment on sucrose scores ($X^2=403.5$, 4 df, $P<0.000\ 1$; FIG. 2). There was no significant effect of replicate on water responses ($X^2=1.5$, 2 df, $P>0.05$). Treatment significantly affected water responses ($X^2=92.3$, 4 df, $P<0.000\ 1$). The results of treatment pair comparisons are reported in Table 2, which has the comparisons for PER responses to sucrose and water stimuli using categorical models (see FIG. 2 for mean PER scores). The larval washes of brood pheromone delivered at a dose of 1:1 Leq:bee and SB at 100:1 had sucrose and water scores that were statistically similar and statistically greater than the controls (Table 2 and FIG. 2). This means that these preparations of brood pheromone significantly decreased response thresholds to sucrose compared to the control treatment. The SB dose of 10:1 did not significantly change sucrose or water scores compared to the control (Table 2 and FIG. 2). However, the SB dose of 1000:1 had sucrose scores that were significantly lower than the control (Table 2 and FIG. 2). Sucrose and water consumption was not significantly different between the pheromone treatments (ANOVA Replicate 1: Sucrose $F_{20,4}=0.3$, $p>0.5$, Water $F_{20,4}=1.0$, $p>0.5$; Replicate 2: Sucrose $F_{20,4}=0.03$, $p>0.05$, Water $F_{20,4}=0.1$, $p>0.05$; Replicate 3: Sucrose $F_{20,4}=0.3$, $P>0.5$, Water $F_{20,4}=0.3$, $P>0.05$). The SB treatment of 1000:1 caused notably higher mortality than the other treatments (38.6%, 40.5%, and 38.5% in replicates 1, 2, and 3 respectively). Mortalities for all other treatments ranged from 0.5% to 9.5%.

TABLE 2

Experiment 3 results of treatment pair comparisons for PER responses to sucrose and water stimuli using categorical models (see FIG. 2 for mean PER scores).

| Comparison | Sucrose response score | | Water response score | |
|---|---|---|---|---|
| | $X^2$ | P(1 df) | $X^2$ | P(1 df) |
| Control vs LW | 84.4 | <0.001 | 8.3 | <0.01 |
| Control vs 10:1 | 2.24 | >0.05 | 1.4 | >0.05 |
| Control vs 100:1 | 75.7 | <0.001 | 10.0 | <0.01 |
| Control vs 1000:1 | 33.1 | <0.001 | 17.3 | <0.001 |
| LW vs 10:1 | 63.5 | <0.001 | 3.1 | >0.05 |
| LW vs 100:1 | 0.4 | >0.05 | 0.05 | >0.05 |
| LW vs 1000:1 | 287.2 | <0.001 | 44.6 | <0.001 |
| 10:1 vs 100:1 | 55.5 | <0.001 | 4.1 | >0.05 |
| 10:1 vs 1000:1 | 59.5 | <0.001 | 27.2 | <0.001 |
| 100:1 vs 1000:1 | 271.9 | <0.001 | 49.5 | <0.001 |

Example 6

Effect of Synthetic Blends and Doses on Foraging Behavior in a Flight-Cage

The efficacies of the two synthetic blends of brood pheromone were examined as foraging stimulants. These experiments were conducted in a large flight cage (18 m×8 m×4.5 m) that was divided into three equal parts. The treatments were presented to colonies on glass plates approximately 328 cm² and 1,312 cm², an area 1000 and 4000 larvae occupy on wax combs, respectively. The blends were poured onto the glass plates and the hexane was allowed to evaporate in a fume hood. The plates were suspended with wire within a standard wooden frame without wax comb and immediately placed in the middle of each colony. Control plates were washed with hexane and presented in the same way. Colonies were manipulated so that colony-level measures such as areas of empty space, pollen, and honey, were equivalent between colonies and treatments. Measures were estimated by the use a wire grid divided into inch square quadrants. The area covered by bees was converted to bee numbers-(1.5 bees per cm). Numbers of bees varied but not significantly and averaged around 12,000. The number of bees foraging at the pollen and sucrose feeding stations were tallied. To avoid counting individuals repeatedly we paint-marked the thorax of each individual tallied. Pollen feeders contained pure ground pollen. Sucrose feeders contained a 30% sucrose solution. Bees were tallied at each feeding station for 9 minutes every hour (a total of 6 stations per hour). Feeders were replenished as necessary and were never empty. To avoid counting the same individual more than once we captured and paint-marked each forager at the feeding stations. Different colors of paint were used for pollen and sucrose foragers for each pseudo-replication so that forager resource switching could be observed between treatments.

One five-minute entrance count was conducted 1,2,3 and 4 hours after treatment on each colony. The observer recorded the type of load for every returning forager, pollen or non-pollen. The rate of colony-level foraging activity was determined as well as the ratio of pollen to non-pollen foragers. In our previous study (Pankiw T. et al., *Behav Ecol Sociobiol* 44:193–198 (1998)) pollen forager entrance counts indicated the length of time after application that brood pheromone significantly stimulated pollen foraging in treated versus control colonies. Entrance counts began one hour after treatment application.

Initially three colonies were alternately treated with three treatments; 1) "young" synthetic blend at 1,000 larval equivalents (Lee.), 2) "old" synthetic blend at 1,000 Leq and, 3) control with blank glass plates (Table 1). Finally, six colonies were alternately treated with three treatments; 1) 'young' synthetic blend at 4,000 larval equivalents (Leq), 2) 'old' synthetic blend at 4,000 Leq and, 3) control with blank glass plates (Table 1). Alternating treatments means that colonies received each of the three treatments on different days with different treatments separated by at. least 2 days per colony. After a treatment the colonies were removed from the flight cage and restored with natural brood for at least 2 days between alternate treatments. In preparation for experimental treatment all frames with any eggs, larvae, or pupae were removed at the same time treatments were applied, at about 0900–1000 h. Treatments remained in the colonies for a maximum of 4.5 hours.

FIG. 3 provides the ratio of pollen to non-pollen foragers counted at pollen and sucrose foraging stations in a flight cage. Colonies were treated with 1000 larval equivalents of "young" and "old" synthetic blends (SB) of brood pheromone or broodless control (3a). In (3b) the ratio of pollen to non-pollen foragers counted at pollen and sucrose foraging stations in a flight cage is shown. Colonies were treated with a dose of 4000 larval equivalents of the synthetic blends.

Figure 3A:
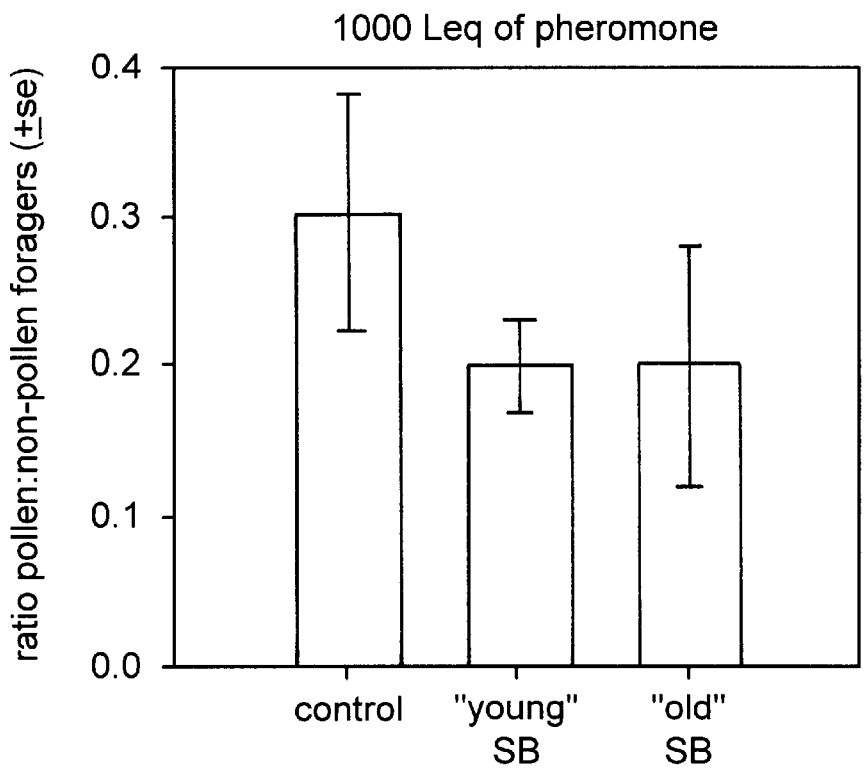
FIG. 3 provides the ratio of pollen to non-pollen foragers counted at pollen and sucrose foraging stations in a flight cage.
Figure 4B:
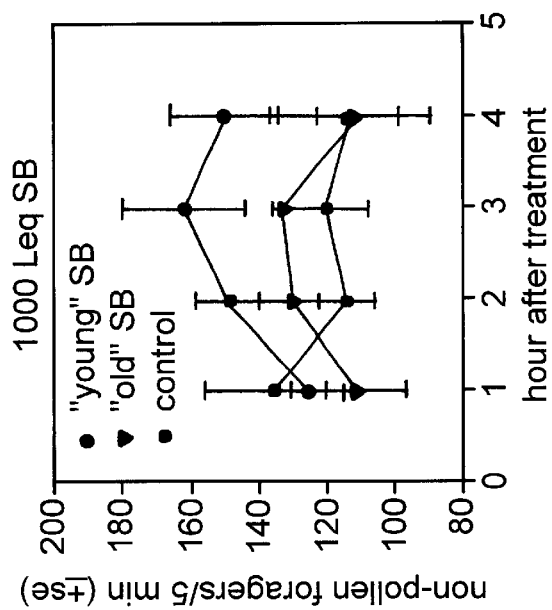
FIG. 4 shows results of pollen (4a) and non-pollen (4b) foragers entering colonies in a 5 minute period 1–4 hours after treatment with 1000 larval equivalents of "young" or "old" synthetic blends (SB) of brood pheromone or broodless control. Results are also shown for pollen (4c) and non-pollen (4d) foragers entering colonies in a 5 minute period 1–4 hours after treatment with 4000 larval equivalents of "young" or "old" synthetic blends (SB) of brood pheromone or broodless control.
Figure 4D:
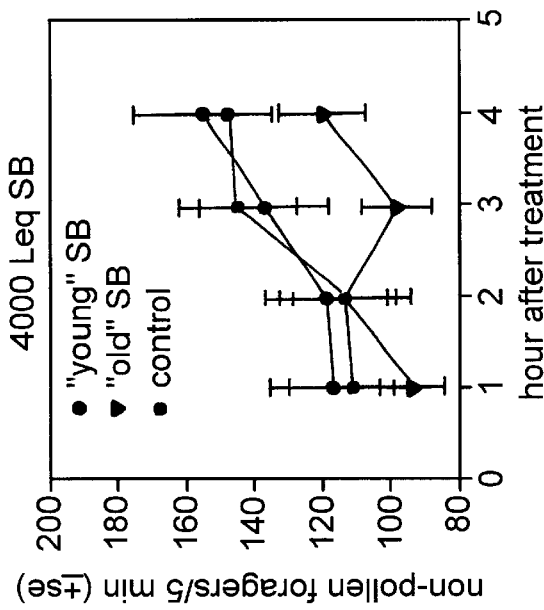
Figure 4A:
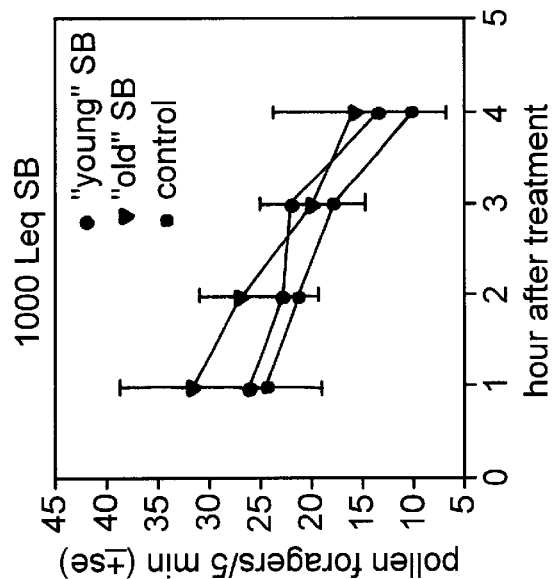

There was no treatment effect on the number of foragers observed at the foraging stations (3X2 Contingency Table analysis $X^2$=3.3, 2 dl p>0. 1; FIG. 3a). Repeated measures analysis of entrance count data showed that there was no significant treatment effect on the number of pollen foragers (F=0.4, 2 df, P>0.05; FIG. 4a), nor on the number of non-pollen foragers (F=1.5 df, P>005; FIG. 4b). The effect of hour after the application of treatments on the number of pollen foragers entering colonies was significant (F=15.7, 3 df, P<0.0001; FIG. 4a), but not significant for the number of non-pollen foragers (F=1.4, 3 df, P>0.OS). The number of pollen foragers entering the colonies significantly decreased with time after the application of treatments such that the number of pollen foragers was significantly lower 4 hours after treatment compared to 1 hour after treatment (F=36.3, I df, P<0.001; FIG. 4a). However, there was no significant interaction of hour by treatment (Pollen F=0.7, 6 df, P>0.05; Non-pollen F=1.9, 6 df, P>0.05), indicating that between treatments the decrease in the number of pollen and non-pollen foragers with time was not different (FIGS. 4a and b).

Figure 3B:
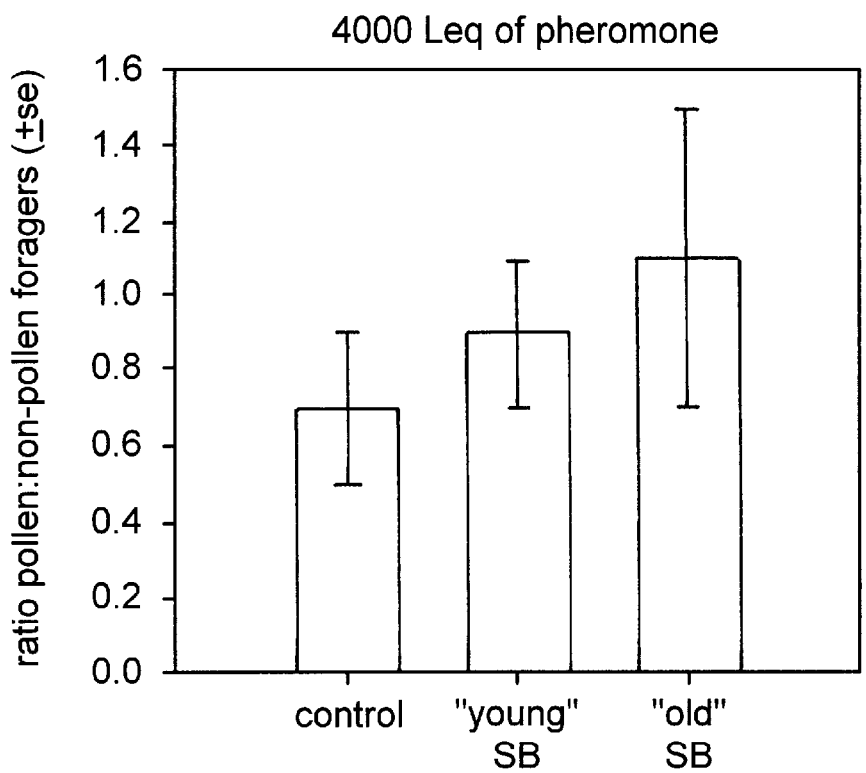
Figure 4C:
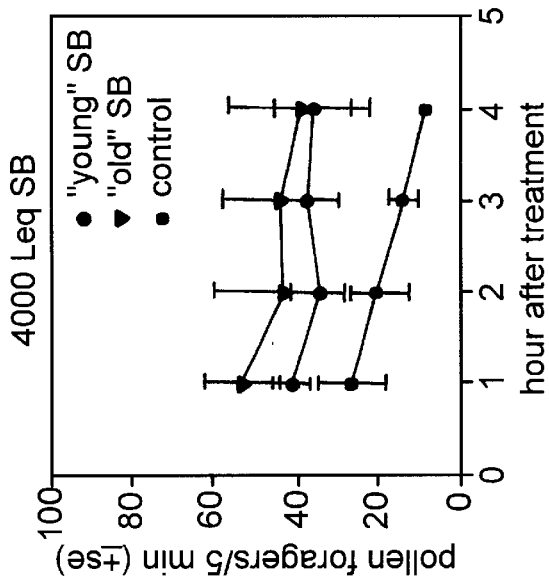

There was a significant treatment effect on the number of foragers observed at the foraging stations (3X2 contingency table analysis $X^2$=45.6, 2 df, P<0.0001; FIG. 3b). The "old" synthetic blend was significantly more stimulating than the "young" blend (2X2 contingency table analysis $x^2$=4.6, 1 df, P<0.02; FIG. 3b). Repeated measures analysis of entrance count data showed that there was no significant treatment effect on the number of pollen foragers (F=0.8 df. p>0.05), nor on the number of non-pollen foragers (F=2.2, 2 df, P>0.05) entering colonies in a 5-minute period (FIGS. 4c and 4d). There was a significant effect of hour on the number of pollen foragers (F=2.8, 3 df, P<0.0.5) entering colonies. This means that the number of pollen foragers entering the colonies decreased with time after application of the treatments (FIG. 4c). There was no effect of hour on the number of non-pollen foragers (F=1.4, 3 df, P>0.05; FIG. 4d). There were no significant interactions of time by treatment for pollen (F=0.7, 6 df, P>0.OOS) or non-pollen foragers (F=1.9,6 df, P>0.05).

No foragers were seen switching between resources due to treatment. For example, a forager observed collecting sucrose in treatment 1 was not subsequently observed collecting pollen in treatments 2 or 3. Any increase in the number of pollen foragers due to treatment was a consequence of additional pollen foragers, rather than previously observed sucrose foragers switching to pollen.

Example 7

Synthetic Brood Pheromone Stimulates Pollen Foraging in Free-Flying Colonies.

Colonies containing 10,000–20,000 bees were selected from approximately 100 colonies in approximately 16 hectare blossoming almond orchard near Davis, Calif., surrounded by other blossoming almond and plum orchards. The number of bees in the colonies was estimated by measuring the comb and hive body areas covered by bees at a time of no foraging. The number of pollen and non-pollen foragers entering colonies in a 5-minute period served as a measure of forager activity in this bioassay (as above).

Replicates were conducted with doses of "old" SB, with ratios increasing from 1:1 to 3:1 Leq of SB to the number of bees. A paired control was used of 0:1 SB. An "old" SB dose of 3:1 showed an increase in the ratio of pollen to non-pollen foragers. This dose was tested in the experiment. Seven colonies received SB doses of 3:1 on glass plates (approximately 1,312 $cm^2$) and seven colonies were controls receiving blank hexane-rinsed plates placed in the broodnest area. At 1 and 2 hour(s) after treatment forager entrance counts were conducted.

Pulse treatments of synthetic brood pheromone were conducted in the same location as above. Colony size was measured as described above. 12 colonies containing approximately 20,000 bees with "old" SB (Table 1) were pulse treated. Colonies were alternately treated with SB at 10:1 and as controls. Colonies receiving SB in the morning for Pulse I received blank control plates in the afternoon for Pulse 11. At 0930 h six colonies received SB at 10:1 Leq:bees and six colonies received blank plates. One hour after treatment the number of pollen and non-pollen foragers entering the colonies were counted for a 5-minute period. The treatment plates were removed when entrance counts were completed. One hour after treatment plate removal, entrance counts were conducted. This completed the Pulse I phase of the experiment. The treatments were alternated between colonies. Six colonies received SB at 10:1 and six received control plates. The same series of events took place. One hour after treatment, entrance counts were conducted, and treatments were removed. Entrance counts were conducted once more 1 hour after removal.

Figure 5:
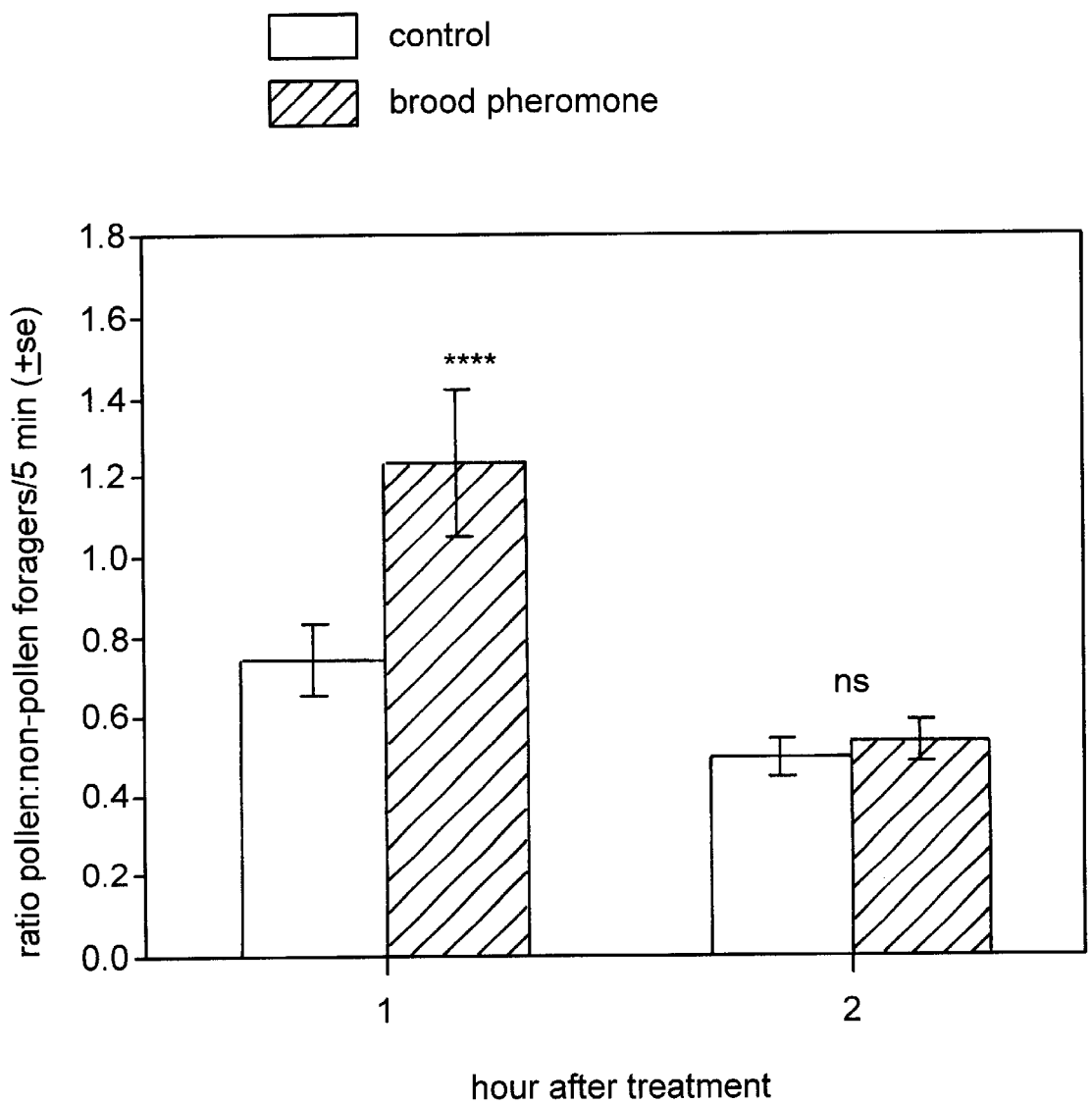
FIG. 5 provides the Ratio of pollen to non-pollen foragers entering free-flying colonies treated with synthetic brood pheromone at a dose of 3:1 larval equivalents to number of bees.

Colonies treated with "old" SB at a dose of 3:1 Leq to bees had significantly more pollen foragers entering colonies than did the control colonies one hour after treatment ($X^2$=47.7, 1 df, P<0.0001; FIG. 5). Two hours after treatment the entrance counts of pollen and non-pollen foragers indicated that there were no differences between treatments ($X^2$=0.7, 1 df, P>0.05; FIG. 5). For FIGS. 5 and 6, ns is "not significant", and "* * *" means a P value of less than 0.0001.

Figure 6:
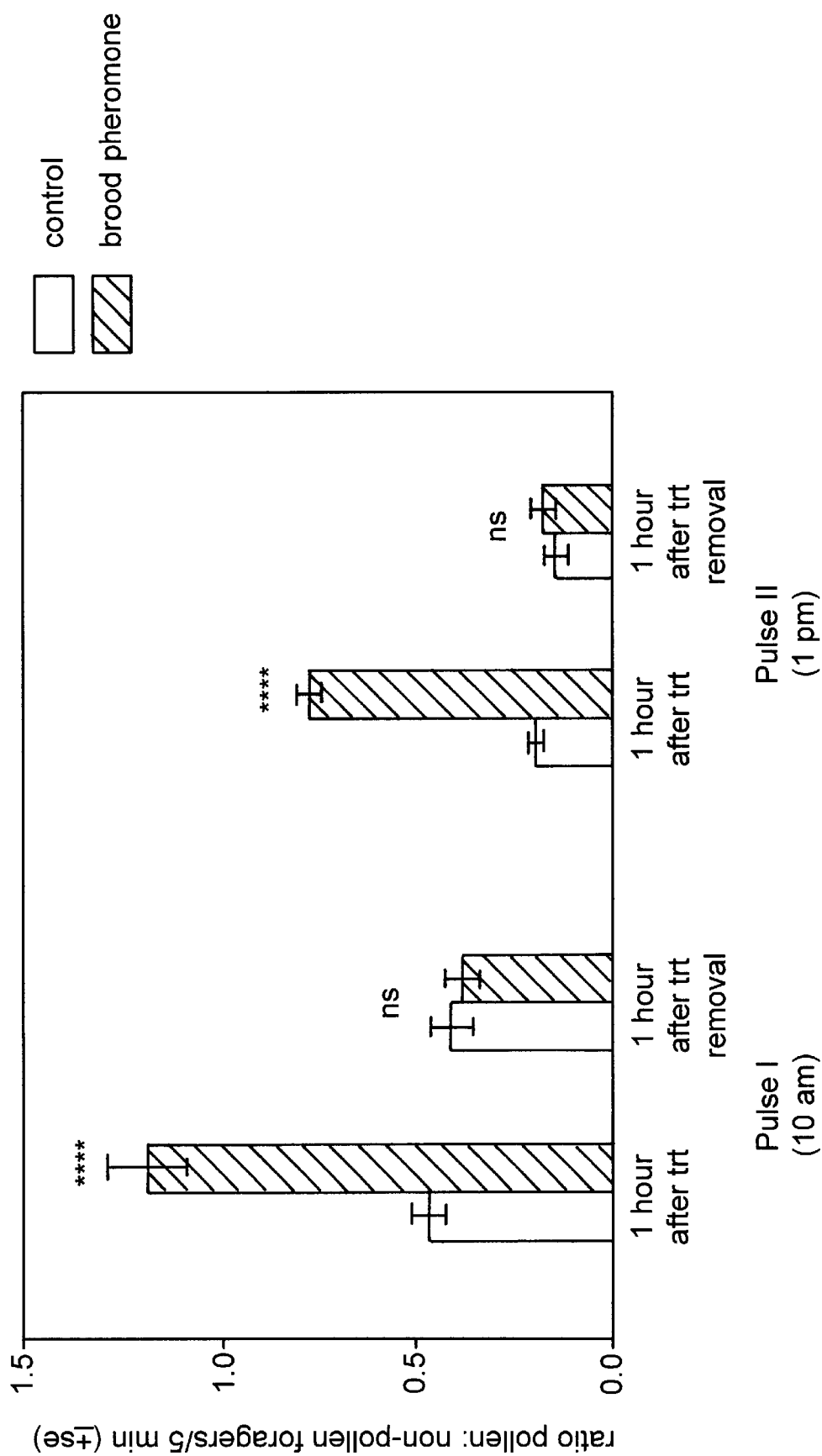
FIG. 6 provides results of measurements of free-flying colonies in a blossoming almond orchard after receiving a pulsed treatment of synthetic brood pheromone at a dose of 10:1 larval equivalents to number of bees. Results are for the ratio of pollen to non-pollen foragers entering colonies in a 5-minute period.

The ratio of pollen to non-pollen foragers entering SB treated colonies was significantly greater in the Pulse I phase of the experiment one hour after treatment ($X^2$=1 84.8, 1 df, P<0.0001; FIG. 6). One hour after the treatment plates were removed from colonies there was no difference in the ratio of pollen to non-pollen foragers entering colonies in Pulse I ($X^2$=0.5, 1 df, P>0.05; FIG. 6). The same results were observed in Pulse II. The ratio pollen to non-pollen foragers entering SB treated colonies was significantly greater one hour after treatment ($X^2$=506.9, 1 dl P<0.0001; FIG. 6), but not different one hour after treatment removal ($X^2$=3.7, 1 df, P>0.05; FIG. 6).

Example 8

Synthetic Brood Pheromone Release Device

A composition is created by incorporating synthetic brood pheromone into a polyurethane matrix (as described in Wakarchuk, "U.S. Pat. No. 5,750,129, Composite Polymer Matrices for controlled Release of Semiochemicals" 1998). The composition is formed as a small plastic release device containing the synthetic brood pheromone. The device is designed to be incorporated into a colony and release synthetic brood pheromone in a controlled fashion among the worker bees of the colony. The device releases a sufficient amount of synthetic brood pheromone to stimulate the worker bees toward increased pollen foraging activity over a period of days to weeks.

Example 9

Pollination Units

Approximately 20,000 bees are collected and placed in a hive containing the synthetic brood pheromone composition of Example 8. The number of pollen and non-pollen foragers entering colonies in a 5-minute period are observed as a measure of forager activity in this bioassay (as above).

Over a period of days to weeks, bees of this synthetic pollination unit are observed returning to the hive, and comprise a significant numbers of pollen foragers.

Example 10

Establishing a Hive

Approximately 20,000 bees are collected and packaged into a hive containing the synthetic brood pheromone composition of Example 8. To this collection is added a queen and queen mandibular pheromone (Bee Boost™, Phero-Tech).

This package of bees is observed over a period of weeks, and establishes a stable, permanent colony.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, it will be obvious that certain changes and modifications may be practiced within the scope of the appended claim.

What is claimed is:

1. A device for delivering synthetic brood pheromone to bees of a colony, said device comprising synthetic brood pheromone incorporated into a substrate, wherein the brood pheromone comprises, by weight percent:
   about 1% ethyl linoleate;
   about 13% ethyl linolenate;
   about 8% ethyl oleate;
   about 3% ethyl palmitate;
   about 7% ethyl stearate;
   about 2% methyl linoleate;
   about 21% methyl linolenate;
   about 25% methyl oleate;
   about 3% methyl palmitate; and
   about 17% methyl stearate.

2. The device of claim 1, wherein said synthetic brood pheromone is released from said substrate within said colony.

3. The device of claim 2, wherein said substrate is capable of controlling the rate of release of said synthetic brood pheromone.

4. The device of claim 3, wherein said rate-controlling substrate is selected from the group consisting of:
   a) solubilizing said pheromone in an organic substance;
   b) suspending said pheromone in water; and
   c) incorporating said pheromone in a solid substrate.

5. The device of claim 4, wherein said organic substance is selected from the group consisting of paraffin, vegetable wax or beeswax.

6. The device of claim 4, wherein said solid substrate is selected from the group consisting of silica, alumina, cellulose, modified cellulose, dry vegetable matter, or a synthetic polymer.

7. The device of claim 6, wherein said synthetic polymer is a polyurethane matrix.

8. The device of claim 7, wherein said synthetic polymer is powdered.

9. The device of claim 8, wherein said matrix is formed for insertion of said device into said colony.

10. A method for increasing pollen foraging activity in bees of the family Apidae, said method comprising exposing a colony of bees to a composition comprising a synthetic brood pheromone, wherein the brood pheromone comprises, by weight percent:
    about 1% ethyl linoleate;
    about 13% ethyl linolenate;
    about 8% ethyl oleate;
    about 3% ethyl palmitate;
    about 7% ethyl stearate;
    about 2% methyl linoleate;
    about 21% methyl linolenate;
    about 25% methyl oleate;
    about 3% methyl palmitate; and
    about 17% methyl stearate.

11. The method of claim 10, wherein said pollen foraging activity is increased by increasing the proportion of pollen foragers in said colony.

12. The method of claim 10, wherein said bees are of the genus Apis.

13. The method of claim 12, wherein said bees are of the species *Apis mellifera*.

14. The method of claim 12, wherein said bees are of the species *Apis cerana*.

15. The method of claim 10, wherein said bees are of the genus Bombus.

16. The method of claim 10, wherein said colony is without brood.

17. The method of claim 10, wherein said colony comprises a new queen.

18. The method of claim 10, wherein said colony is without a queen.

19. The method of claim 10, wherein said composition extends the period of pollen foraging activity in said colony.

20. The method of claim 10, wherein said composition stimulates early pollen foraging activity in said colony.

21. The method of claim 10 further comprising the step of applying to said colony a composition comprising queen mandibular pheromone.

22. The method of claim 10, wherein said composition further comprises a substrate capable of controlling the rate of release of said synthetic brood pheromone to said colony.

23. The method of claim 10 wherein said colony is exposed to said synthetic brood pheromone by a method selected from the group consisting of spraying said composition and vaporizing said composition.

24. A pollination unit comprising
    a) a collection of bees; and
    b) a quantity of synthetic brood pheromone, wherein the brood pheromone comprises, by weight percent:
       about 1% ethyl linoleate;
       about 13% ethyl linolenate;
       about 8% ethyl oleate;
       about 3% ethyl palmitate;
       about 7% ethyl stearate;
       about 2% methyl linoleate;
       about 21% methyl linolenate;
       about 25% methyl oleate;
       about 3% methyl palmitate; and
       about 17% methyl stearate.

25. The pollination unit of claim 24, wherein said collection comprises greater than about 5,000 honey bees.

26. The pollination unit of claim 25, wherein said collection comprises greater than about 10,000 honeybees.

27. The pollination unit of claim 24, further comprising a quantity of synthetic queen mandibular pheromone.

28. The pollination unit of claim 24, further comprising a comb.

29. The pollination unit of claim 24, further comprising a source of food for said bees.

30. The pollination unit of claim 24, further comprising a housing unit for said bees.

31. The pollination unit of claim 30, wherein said housing unit is disposable.

32. The pollination unit of claim 30, wherein said quantity of synthetic brood pheromone is affixed to said housing unit.

33. The pollination unit of claim 24 further comprising a queen.

34. The pollination unit of claim 24, wherein said bees are of the family Apidae.

35. The pollination unit of claim 34, wherein said bees are of the genus Apis.

36. The pollination unit of claim 35, wherein said bees are of the species *Apis mellifera*.

37. The pollination unit of claim 35, wherein said bees are of the species *Apis cerana*.

38. The pollination unit of claim 34 wherein said bees are of the genus Bombus.

39. The pollination unit of claim 24, wherein said synthetic brood pheromone is incorporated into a matrix capable of controlling the rate of release of said synthetic brood pheromone to said colony.

40. The pollination unit of claim 39, wherein said matrix is formed into a device for insertion into said colony.

* * * * *

UNITED STATES PATENT AND TRADEMARK OFFICE
CERTIFICATE OF CORRECTION

PATENT NO. : 6,595,828 B2  Page 1 of 1
DATED : July 22, 2003
INVENTOR(S) : Page, Jr. et al.

It is certified that error appears in the above-identified patent and that said Letters Patent is hereby corrected as shown below:

<u>Column 1,</u>
Line 4, insert:

-- STATEMENT AS TO RIGHTS TO INVENTIONS MADE UNDER FEDERALLY SPONSORED RESEARCH AND DEVELOPMENT
    This invention was made with Government support under Grant No. MH53311 awarded by the National Institutes of Health and Grant No. IBN-9728608, awarded by the National Science Foundation. The Government has certain rights in this invention. --

Signed and Sealed this

Fourth Day of November, 2003

JAMES E. ROGAN
*Director of the United States Patent and Trademark Office*